United States Patent
Kloepper et al.

(10) Patent No.: US 11,238,371 B2
(45) Date of Patent: Feb. 1, 2022

(54) COMPUTER SYSTEM AND METHOD FOR MONITORING THE STATUS OF A TECHNICAL SYSTEM

(71) Applicant: ABB Schweiz AG, Baden (CH)

(72) Inventors: Benjamin Kloepper, Mannheim (DE); Benedikt Schmidt, Darmstadt (DE); Mohamed-Zied Ouertani, Mannheim (DE)

(73) Assignee: ABB Schweiz AG, Baden (CH)

( * ) Notice: Subject to any disclaimer, the term of this patent is extended or adjusted under 35 U.S.C. 154(b) by 160 days.

(21) Appl. No.: 16/441,028

(22) Filed: Jun. 14, 2019

(65) Prior Publication Data

US 2019/0294998 A1    Sep. 26, 2019

Related U.S. Application Data

(63) Continuation of application No. PCT/EP2017/079397, filed on Nov. 16, 2017.

(30) Foreign Application Priority Data

Dec. 14, 2016   (EP) .................................... 16203972

(51) Int. Cl.
  *G06N 20/00* (2019.01)
  *H04W 4/38* (2018.01)
  *G05B 23/02* (2006.01)

(52) U.S. Cl.
  CPC ......... *G06N 20/00* (2019.01); *G05B 23/0221* (2013.01); *H04W 4/38* (2018.02)

(58) Field of Classification Search
  CPC ...... H04W 4/38; G05B 23/0221; G06N 20/00

USPC ......................................................... 702/183
See application file for complete search history.

(56) References Cited

U.S. PATENT DOCUMENTS

| | | | |
|---|---|---|---|
| 2009/0222142 A1* | 9/2009 | Kao | G05B 15/02 700/291 |
| 2015/0112640 A1 | 4/2015 | Niro et al. | |
| 2015/0254719 A1* | 9/2015 | Barfield, Jr. | G06Q 30/0273 705/14.53 |
| 2016/0054720 A1 | 2/2016 | Lo et al. | |
| 2021/0262689 A1* | 8/2021 | Shinde | G06N 20/10 |

* cited by examiner

*Primary Examiner* — Catherine T. Rastovski
*Assistant Examiner* — Aeysha N Sultana
(74) *Attorney, Agent, or Firm* — Leydig, Voit & Mayer, Ltd.

(57) ABSTRACT

A computer system can be configured to: receive, in a low-precision mode, first status data generated by one or more sensors, the first status data reflecting technical parameters of a technical system, the first status data exhibiting a first precision level; apply a low-precision machine learning model to analyze the first status data for one or more indicators of an abnormal technical status, the machine learning model having been trained with data exhibiting the first precision level; send, based on an abnormal technical status being indicated, instructions for the one or more sensors to generate second status data exhibiting a second precision level, the second precision level being associated with greater accuracy than the first precision level; receive the second status data exhibiting the second precision level based on the sent instructions; providing the second status data to a data analyzer.

15 Claims, 4 Drawing Sheets

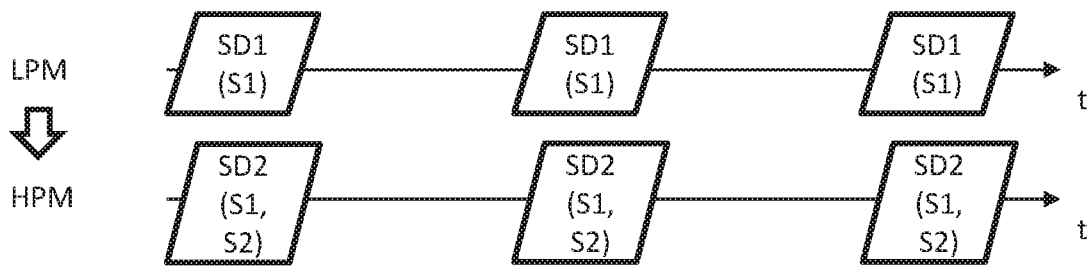
FIG. 3A  additional sensors
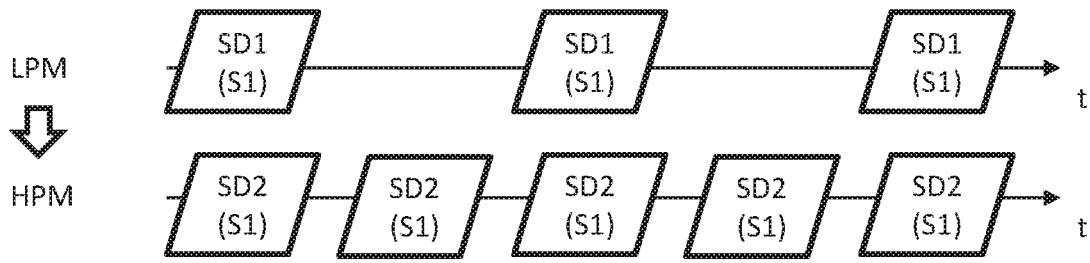
FIG. 3B  higher frequency
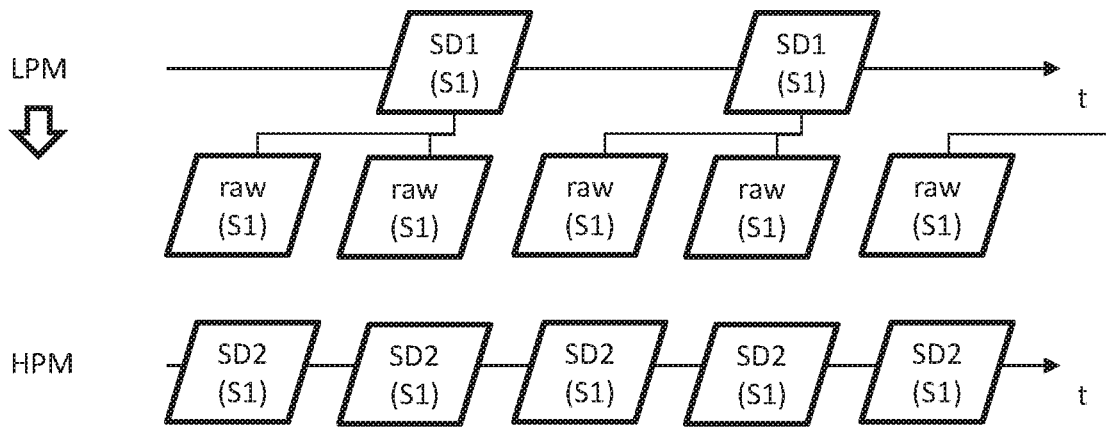
FIG. 3C  pre-processing/aggregation

COMPUTER SYSTEM AND METHOD FOR MONITORING THE STATUS OF A TECHNICAL SYSTEM

CROSS-REFERENCE TO PRIOR APPLICATIONS

The present application is a continuation of International Application No. PCT/EP2017/079397, which is hereby incorporated by reference. The International Application was filed on Nov. 16, 2017 and claims priority to European Patent Application No. EP 16203972.1, which was filed on Dec. 14, 2016. The International Application published in English on Jun. 21, 2018 as WO 2018/108429 A1 under PCT Article 21(2).

TECHNICAL FIELD

The present disclosure generally relates to state monitoring of technical systems, and more particularly, relates to methods, computer program products and systems for switching sensitivity of technical state monitoring.

BACKGROUND

Many systems are monitored via sensors. For example, for an electro-mechanical system (e.g., an engine) a vibration may indicate a future break down of the system. In such cases it can be advantageous to take repair or maintenance measures at an early stage rather than waiting for the breakdown of the complete system. The respective sensor data reflecting the system's technical status is often provided sporadically (e.g., event driven) or based on very coarse data sampling.

Coarse or infrequently collected data may allow for the identification of an increased probability of an upcoming failure, however, the data amount of such data is may be unsuitable for automated data analysis. Sending status data at a higher transmission frequency may be impractical due to energy or data-bandwidth constraints, which may be particularly acute when multiple sensors are reporting technical data in parallel.

SUMMARY

A computer system can be configured to monitor the technical status of a technical system. The computer system can include an interface module, a machine learning module, and a command generator module.

The interface module can be configured to: receive, in a low-precision mode, first status data generated by one or more sensors, the first status data reflecting technical parameters of the particular technical system, the first status data exhibiting a first precision level; send one or more instructions for the one or more sensors, the one or more instructions configured to cause the one or more sensors to generate second status data, the second status data exhibiting a second precision level, the second precision level being associated with greater data accuracy than the first precision level; and provide the second status data to a data analyzer. The machine learning module can be configured to apply a low precision machine learning model to the received first status data, the low precision model having been trained, with data exhibiting the first precision level, to analyze the received first status data for one or more indicators of an abnormal technical status. The command generator module can be configured to generate the one or more instructions for the one or more sensors in response to an abnormal technical status being indicated.

BRIEF DESCRIPTION OF DRAWINGS

Embodiments of the present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 3A, 3B, 3C illustrate examples for changing precision parameters from low-precision mode to high-precision mode.

DETAILED DESCRIPTION

Figure 1:
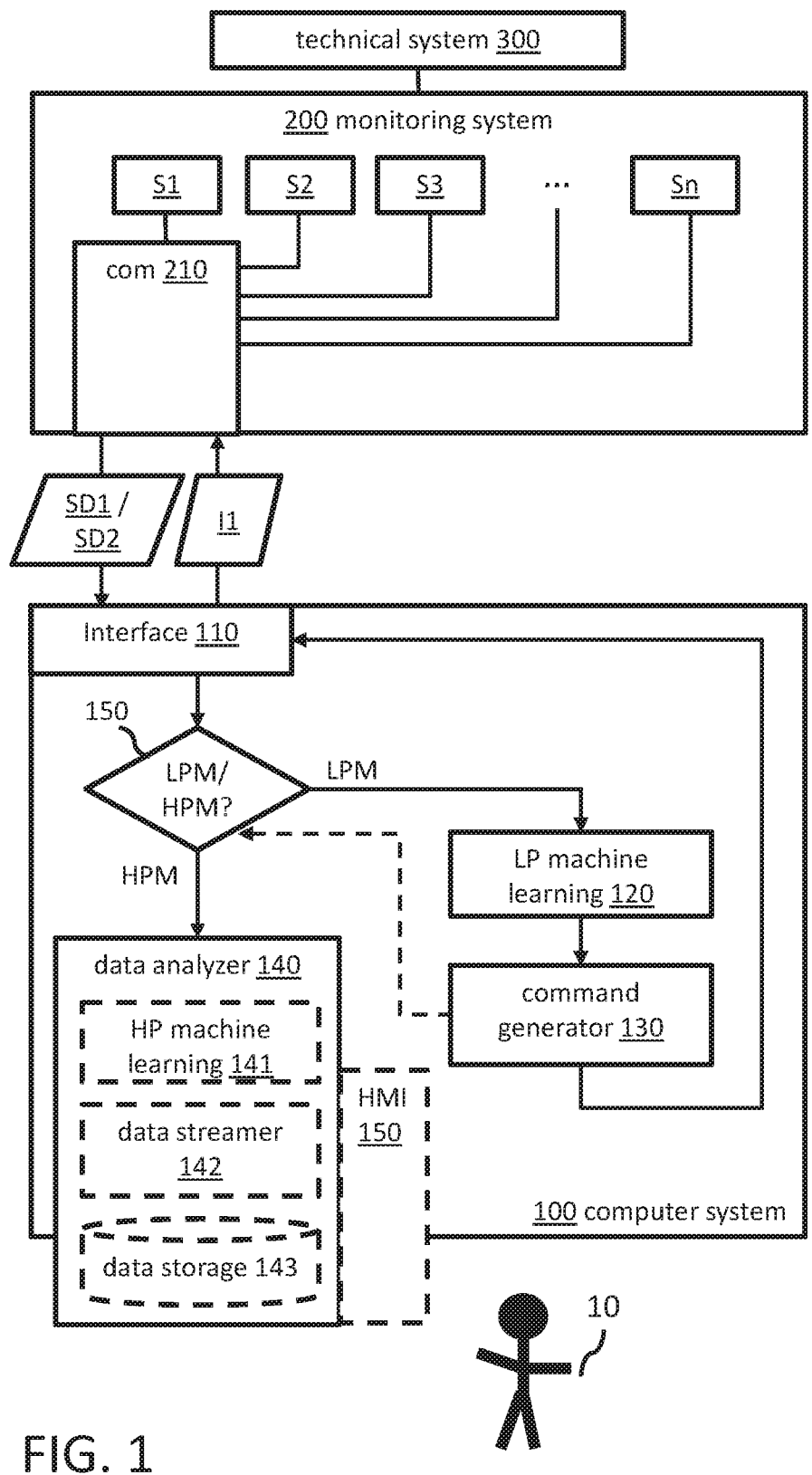
FIG. 1 shows a simplified block diagram of a monitoring system communicatively coupled with a computer system for monitoring the technical status of a particular technical system according to one embodiment.

Among other things, disclosed embodiments perform monitoring of technical systems with improved data accuracy while maintaining a low power and low bandwidth consumption environment with regards to the monitoring sensors.

In certain scenarios where a prediction of the future behavior of a technical system is desired (e.g., prediction of a tool failure for predictive maintenance, prediction of system load for future resource allocation, etc.), a Machine Learning Model is trained to learn about the system behavior. Based on the learned system behavior a prediction into the future system behavior can be made by appropriate prediction algorithms.

The accuracy of prediction depends on the relevance and/or preciseness of the training data which have been collected in the past. However, often the corresponding data is sent at a low rate and not necessarily at regular intervals but sporadically (event driven). For example, a sensor to monitor a particular machine capability may send data every 10 minutes or it may send data only in cases where a predefined threshold (e.g., a threshold temperature value) is exceeded to save battery power and bandwidth. A Machine Learning Model which is trained with such infrequently collected data is of course quite inaccurate in its prediction accuracy. Nevertheless, instead of simply collecting training data at a high rate or with high accuracy (e.g., by sending more data by using data packets) which would increase energy consumption and bandwidth and storage requirements, the proposed solution works with a low-accuracy prediction model until the monitored data indicates an abnormal situation. In other words, the system runs in a low-precision mode as long as no abnormalities in the collected data can be identified in view of the learned system behavior. However, once an abnormal situation is detected, for example, because a threshold probability for the system to reach a critical state is exceeded, the system switches into a high-precision mode. The high-precision mode is characterized in that the monitoring data is now collected and provided at a higher frequency, or more data is collected (for example by activating additional sensors), or more relevant/ precise data is collected by performing less pre-processing on the raw data. The monitoring data which now is collected in the high-precision mode is stored in an analytics data structure.

In one embodiment, a high-accuracy prediction model which has been trained with data collected in the high precision mode may be used to analyze the data for confirming or denying an abnormal system situation and suggest or trigger a corresponding action (e.g., switch between redundant components, switch-off components, perform emergency stop).

In one embodiment, the data collected in the high-precision mode may be streamed to a human-machine interface of an operator of the system (e.g., a service technician) to take appropriate action based on the high-precision data (e.g., trigger a replacement of a component which is expected to fail soon).

Different embodiments of the invention can be implemented in the form of computer systems, computer-implemented methods, and computer program products as disclosed in the independent claims.

In one embodiment, a computer system is provided for monitoring the technical status of a particular technical system. The computer system interacts with a monitoring system which includes the sensors generating sensor data forming the basis for the status data of the particular system. In general, the computer system and the monitoring system can be remote from each other or may be implemented on a common computer platform. The status data may include raw sensor data but may also include pre-processed sensor data providing information about the technical status of the monitored system. That is, a sensor may directly provide status data (either raw data or pre-processed data). It may also provide raw data to a further module where pre-processing is performed on the sensor data to finally generate the status data.

The computer system has an interface module to receive status data in a low-precision mode. The status data is based on sensor data generated by one or more sensors (of the monitoring system). The status data reflect technical parameters of the particular technical system. For example, such technical parameters can include, but are not limited to, temperature, pressure, gas concentration, vibration, etc. The low-precision mode (LPM) is characterized by the received status data complying with a first precision level. The precision level reflects the quality of status data with regards to evaluating the technical status of the particular technical system. For example, if only a subset of available sensors is used to generate the sensor data for the status data then the quality of the status data for analysis is typically lower than in a situation where all of the available sensors provide data for the status data monitoring the technical status. In another example, a sensor may provide status data at a low frequency in order to save energy and bandwidth. As a result, the quality of the respective status data for analyses is typically lower compared to a situation where the sensor is providing data at a higher frequency. In another example, sensor data may be pre-processed (e.g., by extracting average values, mean values, max or min values, etc.) where a plurality of sensor raw data is typically processed or aggregated into a single value. In general, pre-processed status data consume less memory than the original raw data.

Typically, such pre-processed data have a lower quality for analysis than the original raw data. Low precision mode, as used herein, always relates to a high precision mode (HPM). That is, the first precision level of the low precision mode is associated with a lower data accuracy (or data quality) of the status data than the second precision level of the high precision mode which is associated with higher data accuracy of the status data with regards to the prediction of the future status of the monitored system.

The computer system further has a Machine Learning module to apply a low-precision Machine Learning Model to the received status data. The low-precision data model is trained on training data complying with the first precision level to analyze the received status data (also complying with the first precision level) for one or more indicators of an abnormal technical status, and to detect an abnormality indicator. In other words, the precision of the Machine Learning Model is adapted to the precision of the received status data. The precision of the status data can be influenced by the quality and/or the quantity of the status data sampled by the sensors of the monitoring system. The Machine Learning Model can be based on a predictive classification or regression algorithm. The prediction algorithm can be a probabilistic algorithm or a deterministic algorithm. Specific examples of such predictive algorithms are provided in the detailed description. Examples of abnormality indicators are an increasing or decreasing pressure, temperature or vibration level which deviates from the expected behavior of the monitored technical system as learned by the low-precision Machine Learning module during the training phase.

Probabilistic algorithms (e.g., Naïve Bayes classifier, Bayesian networks, log. Regression) result in machine learning models returning the probability of a relevant event (relevant future event). This probability can be used to control the data collection process. The monitoring system switches from LPM to HPM based on a number indicating the probability with which the probabilistic Machine Learning Model indicates the relevant event. For this purpose, the monitoring system can generate a pseudo-random number R between 0 and 1 and switch to HPM if R>=probability of relevant event. This way, the analytics structure is filled with a mix of normal and abnormal situations suitable for applying machine learning algorithms to generate high precision mode models.

Deterministic algorithms (e.g., decision trees, support vector machines, linear/non-linear regression, gradient boosting machines . . . ) result in models that make a binary decision whether an event occurs. The monitoring system switches from LPM to HPM when an event is indicated by the model. Most commonly LPM models have a lower prediction accuracy (i.e. more false positives and false negatives) than HPM models.

Once the Machine Learning module detects such an abnormality indicator in the low-precision mode, the abnormality indicator is interpreted by the computer system in such a way that it represents a warning that the technical system may deviate from its normal operating status. Therefore, the computer system uses the detected abnormality indicator as a trigger to switch the monitoring process for the technical system from the current low-precision mode to a high-precision mode.

For this purpose, a command generator module generates one or more instructions for the one or more sensors in case the abnormality indicator is detected. The one or more instructions are configured to cause the one or more sensors to generate further sensor data for status data which comply with a second precision level wherein the second precision level is associated with higher data accuracy than the first precision level as explained earlier.

The generated instruction(s) are provided to the one or more sensors of the monitoring system via the interface module of the computer system. Typically, the instructions are received by a communication module of the monitoring system where they may be pre-processed before being applied to the various sensors to change one or more precision parameters of the monitoring system. In response to the instructions, the monitoring system starts to provide the further status data (i.e., all status data sent after the application of the new precision parameters) in the high-precision mode.

The interface module of the computer system then receives the further status data now complying with the second precision level and provides the received further status data to a data analyzer.

The computer system is therefore capable to detect suspicious behavior of the monitored technical system while running in a low-precision mode with low bandwidth requirements for the collection and transmission of sensor data and, typically, with low energy consumption by the one or more sensors. Energy consumption of sensors, especially in an Internet of Things (IoT) environment is a critical parameter because many sensors are operated with batteries. Therefore, the sensors are preferably operated in a low power mode which automatically leads to the low-precision mode for the monitoring process because data transmission by the sensors is often reduced to a minimum. Nevertheless, the low-precision status data may still be sufficient to reflect a potential deviation of the technical system from its normal operating status. The low-precision Machine Learning module is trained on such low-precision data which allows the computer system to recognize potential abnormalities. In such a case the system decides to examine the suspicious behavior of the technical system in more detail and switches the monitoring system into a high-precision mode to provide further sensor status data which are more appropriate to analyze the potentially wrong behavior than the low-precision data. The high-precision mode is consuming more power and reduces the operating life time of battery operated sensors. Therefore, the switching to the high-precision mode only in situations where the abnormality indicator gives some reason to assume a misbehavior of the technical system saves power consumption for the sensors and further saves bandwidth for the transmission of the sensor data while, at the same time, allowing to detect potential errors of the system with high accuracy.

The Machine Learning Model is a predictive Machine Learning Model based on a predictive classification algorithm or a predictive regression algorithm as they are frequently used in data mining activities. Such algorithms can be probabilistic or deterministic. For example, in the case of using a probabilistic predictive data mining (machine learning) algorithm, the abnormality indicator may only be detected in case a predefined probability threshold is exceeded.

The data analyzer for analyzing the high-precision status data can be an integrated module of the computer system itself or it may be communicatively coupled with the computer system. The data analyzer may support different functions for analyzing the high-precision status data received from the monitoring system.

In one aspect, the data analyzer has a further Machine Learning Model trained on training data complying with the second precision level. That is, the high-precision Machine Learning Model can be applied to the high-precision status data to analyze such data for one or more indicators of an abnormal technical status of the technical system. This analysis is performed with higher accuracy than the analysis performed by the low-precision Machine Learning module. For examples, the high-precision Machine Learning module can predict future failure of the technical system based on the received high-precision status data. Appropriate alarms can be automatically raised by the high-precision Machine Learning module.

In one aspect, the data analyzer streams the further status data to a human-machine interface. In this case, a human operator can analyze the high-precision status data reflecting the technical status of the technical system and take appropriate action to prevent failure of the system. For example, a part may be replaced by a spare part before it finally brakes.

In one aspect, the data analyzer further includes a data storage component to store the received further status data. For example, the stored data may be used for training the high-precision Machine Learning module or they may be provided for later off-line analysis.

The complementary monitoring system is a further embodiment of the invention for monitoring the technical status of the particular technical system. As already described previously, the monitoring system includes one or more sensors to generate sensor data, in a low-precision mode (LPM), for low-precision status data reflecting technical parameters of the particular technical system. The low-precision mode is characterized by the status data complying with the first precision level.

The monitoring system further has a communication module to provide the status data to the complementary computer system for analyzing the status data with its low-precision Machine Learning Model for one or more indicators of an abnormal technical status. Further, the communication module receives the instructions (generated by the complementary computer system) for the one or more sensors to generate the further (high-precision) status data complying with the second precision level if the provided low-precision status data indicates a potentially abnormal technical status of the monitored technical system. In other words, if the information about a potentially abnormal behavior of the technical system is encoded in the provided low-precision status data, the communication module is instructed to switch the monitoring system into the high-precision mode for high-precision status data generation. This is achieved by changing, in response to and in accordance with the received instructions, at least one precision parameter controlling the accuracy of the high-precision status data to comply with the second precision level. Finally, the communication module provides the further high-precision status data to the complementary computer system and its data analyzer.

The change of precision parameters can be performed in multiple ways or a combination thereof. For example, the instructions may activate additional sensors which were not used for the generation of the low-precision status data. For example, if a declining temperature raises a suspicion that a tube may be leaking, an additional sensor for measuring the pressure in the tube may be activated. This improves not only the quantity of the status data in the high-precision mode but also the quality of the high-precision status data by adding an additional physical parameter reflecting the technical system status.

In another example, the instructions may cause the sensors or the communication component to send high-precision status data at a higher frequency than the low-precision.

This provides a better resolution in time and a high-precision Machine Learning module may be capable to find a particular abnormality indicator with high accuracy and reliability.

In one example, the communication module often performs some form of data preprocessing on the sensor raw data before sending the preprocessed low-precision status data to the complementary computer system. For example, multiple raw data is averaged or otherwise aggregated to save bandwidth in the data transmission. The instructions may now cause a reduction of the data preprocessing so that the high-precision status data has a lower degree of preprocessing than the low-precision status data. In the extreme case, data pre-processing may be abandoned totally and the raw data of the sensors is directly transmitted to the complementary computer system and its analyzer for further analysis.

The monitoring system is automatically switched from the low-precision mode to the high precision-mode once the low-precision status (saving power and bandwidth) indicate a potential deviation of the technical system from its normal operating status. Only in such cases the monitoring system switches to a higher status data accuracy (quality) at the cost of higher power and/or bandwidth consumption. The reward is a finer granularity of the status data which allows a more reliable analysis of potential failure via predictive algorithms applied by the complementary computer system or by the analysis of the high-precision data by a human operator.

In one embodiment a computer-implemented method for monitoring the technical status of the particular technical system is executed by the computer system and includes the following steps: receiving, in a low-precision mode, status data based on sensor data generated by one or more sensors of the complementary monitoring system, the status data reflecting technical parameters of the particular technical system wherein the low-precision mode is characterized by the received status data complying with a first precision level; applying a low-precision Machine Learning Model to the received status data wherein the low-precision data model is trained on training data complying with the first precision level to analyze the received status data for one or more indicators of an abnormal technical status; if an abnormality indicator is detected, sending instructions for the one or more sensors to generate further status data complying with a second precision level, the second precision level being associated with higher data accuracy than the first precision level; in response to sending instructions, receiving the further status data complying with the second precision level; and providing the further status data to a data analyzer.

In one embodiment, where the data analyzer has a further Machine Learning Model trained on training data complying with the second precision level, the method further includes: applying the further Machine Learning Model to the further status data to analyze the further status data for one or more indicators of an abnormal technical status. The Machine Learning Models are predictive Machine Learning Models based on a predictive classification algorithm or a predictive regression algorithm.

In one embodiment, a computer program product includes instructions that, when loaded into a memory of the computer system and executed by at least one processor of the computer systems, cause the computing device to execute the steps of the above computer-implemented method and to perform the functions of the above described computer system.

In one embodiment, a computer-implemented method for monitoring the technical status of a particular technical system is executed by the complementary monitoring system and includes the following steps: generating, in a low-precision mode, by one or more sensors, sensor data for status data reflecting technical parameters of the particular technical system wherein the low-precision mode is characterized by the status data complying with a first precision level; providing the status data to a low-precision Machine Learning Model for analyzing the provided status data for one or more indicators of an abnormal technical status; if the provided status data indicates an abnormal technical status, receiving from the low-precision Machine Learning Model one or more instructions for the one or more sensors to generate further status data complying with a second precision level, the second precision level being associated with higher data accuracy than the first precision level; in response to the received instructions, changing at least one precision parameter to generate the further status data complying with the second precision level; and providing the further status data to a data analyzer.

The changing the at least one precision parameter step includes any one or a combination of the following steps: —adding one or more additional sensors to the one or more sensors to provide the further status data including additional status data from the additional sensors; —providing the further status data at a higher frequency than the status data provided in the low-precision mode; and —while generating the further status data, reducing data pre-processing or data aggregation with regards to the status data in the low-precision mode.

In one embodiment, a computer program product includes instructions that when loaded into a memory of a computer component of the monitoring system and executed by at least one processor of the computer component cause the computer component to execute the steps of the previous computer-implemented method to perform the functions of the complementary monitoring system as disclosed.

Further aspects of the invention will be realized and attained by means of the elements and combinations particularly depicted in the appended claims. It is to be understood that both, the foregoing general description and the following detailed description are exemplary and explanatory only and are not restrictive of the invention as described.

Figure 2:
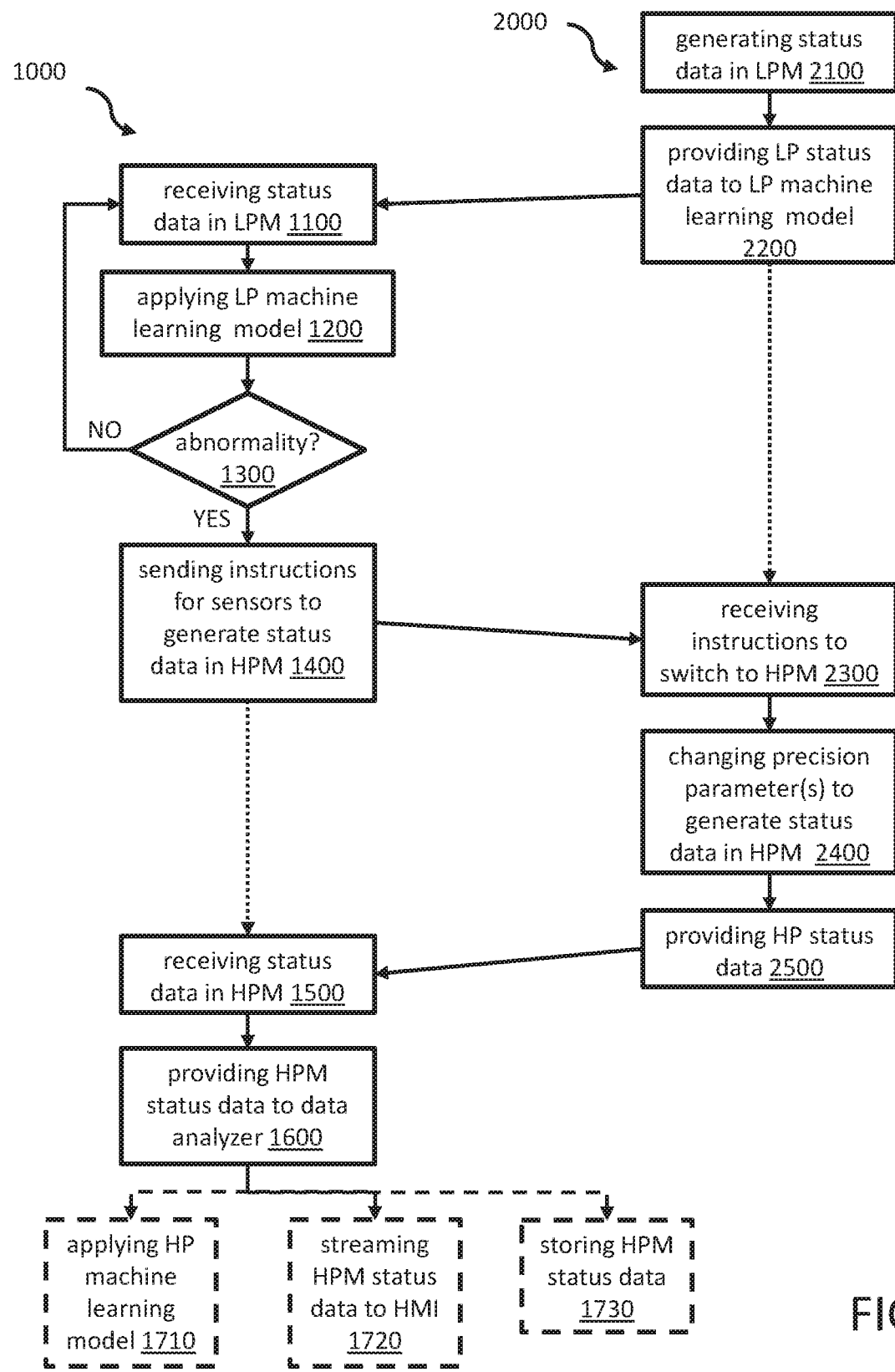
FIG. 2 is a simplified flowchart of two complementary computer-implemented methods according to an embodiment.

FIG. 1 shows a simplified block diagram of a monitoring system 200 communicatively coupled with a computer system 100 for monitoring the technical status of a particular technical system 300 according to one embodiment of the invention. FIG. 1 is described in the context of the computer-implemented methods 1000, 2000 which are performed by computer system 100 and the complementary monitoring system 200, respectively, and which are illustrated in the flow charts of FIG. 2. The following description refers to both figures with the respective reference numbers. Examples for the technical system 300 are wind turbines, robots, pumps, chemical reactors, or any other technical system where the technical status can be monitored by one or more sensors. The monitoring of technical parameter values is performed by the one or more sensors S1 to Sn which are be part of the monitoring system 200. In some implementations, the monitoring system 200 and its sensors can be an integral part of the technical system 300 itself. For example, temperature or pressure sensors may be installed inside a chemical reactor or inside pumps of the technical systems 300 itself. However, with the advent of Internet of Things (IoT) technologies, more and more sensors are installed separately to observe technical status parameters reflecting the technical state of the technical system. For example, vibration sensors may simply be placed or mounted on a part of the technical system and can be connected to a central communication module 210 of the monitoring system 200 for proving the sensed parameter values for further analysis. Sensors may be connected via wireless communication connections or they may be connected through wired connections (e.g., in the case of sensors which are integral components of the technical system 300).

Examples for sensors which are used to monitor technical parameter values of the technical system are: temperature sensors, pressure sensors, vibration sensors, microphones, visual sensors (e.g., cameras), flow meters, etc. A person skilled in the art can integrate any sensor which provides useful technical status data about the technical system into the monitoring system 200. Especially in the case of IoT sensors, such sensors are typically powered by a battery. One requirement for such sensor infrastructures is that a sensor should have a long life time before the battery needs to be replaced, or that the battery has not to be replaced during the lifetime at all. Further, the network bandwidth for such sensor networks is typically limited. Therefore, data transmission through the network is limited. As a consequence, such sensor networks are typically operated in such a way that data transmission to the communication module 210 is kept at a minimum. This may be achieved by a low sampling frequency of status data samples by the respective sensor (e.g., followed by a respective reduction of the transmission frequency) or by using only a subset of available sensors of the monitoring system 200. It is also possible, to apply pre-processing (e.g., mean, average, etc.) to the raw sensor data (either by the sensors themselves of by the communication module) to reduce the amount of data which is provided for further analysis. The communication module 210 may include a hierarchy of sub-modules where each of the sub-modules collects sensor data of a subset of the sensors S1 to Sn which can then be further pre-processed by the communication module 210 before being sent to the computer system 100 for further analysis.

In normal operation, the monitoring system 200 is operated in a low-precision mode which typically implies that only a subset of the available sensors is used. Typically, these sensors collect and provide technical parameter values at a relatively low frequency (e.g., low sampling frequency and/or low transmission frequency of sensor-outbound transmission) to save battery power and bandwidth. In some cases, the data provided by the sensors are already pre-processed to further reduce the amount of data to be sent through the network. In some cases, the communication module 210 may perform (further) pre-processing of the received sensor data. Nevertheless, such parameter values captured in the low-precision mode reflect the technical status of the technical system and are referred to as low-precision status data SD1 herein. The low-precision status data SD1 generated 2100 by the communication module correspond to a compromise between providing status data in accordance with long battery life times of the sensors and low bandwidth consumption of the network due to the transmission of such status data on the one hand, and providing status data at an accuracy or data quality level which is good enough to extract meaningful information about the technical status of the technical system.

The generated low-precision (LP) data SD1 is then provided 2200 to, and received 1100 by, an interface module 110 of the complementary computer system 100 to be analyzed by a LP Machine Learning Model 120. As long as the computer system 100 is operated in the low-precision mode (LPM), a router 150 routes the received LP status data SD1 reflecting technical parameters of the particular technical system directly to the LP Machine Learning module 120 of the computer system 100. The LP Machine Learning module 120 applies 1200 a low-precision Machine Learning Model to the received LP status data SD1. Thereby, the LP Machine Learning Model is trained on training data complying with the first precision level (low-precision level) to analyze the received status data for one or more indicators of an abnormal technical status of the technical system 300. Typically, machine learning models are trained before they are applied to data for analyzing the data. Some models (e.g., Hidden Markov Models) can also be continuously trained while in operation. For the disclosed embodiments it is irrelevant when the model(s) are trained. For example, an abnormal technical status may be detected if a temperature value (or any other technical parameter value) deviates from the value which is expected based on the training data.

If an abnormality indicator is detected 1300, a command generator 130 of the computer system 100 generates one or more instructions for the one or more sensors to generate further sensor data for high-precision (HP) status data complying with a second precision level wherein the second precision level is associated with higher data accuracy than the first precision level. In other words, the generated instruction(s) I1 are configured to switch the monitoring system 200 from the LP mode (LPM) into a HP mode (HPM) by instructing the monitoring sensors accordingly. In cases where pre-processing of the sensor data is performed by the communication module, the generated instructions may also include instructions directed to the communication module to change data pre-processing accordingly. If no abnormality indicator is detected 1300, the computer system 100 simply continues to receive 1100 LP status data and analyzes the received LP status data with the LP Machine Learning Model.

The one or more generated instructions are then sent 1400 to the monitoring system 200 via the interface module 110 where they are received 2300 by the communication module 210. The communication module forwards the received instructions to the respective sensors to change 2400 precision parameters in such a way that the respective sensors provide sensor data for HP status data after the switch. For example, for sensors which can be switched directly from LPM to HPM the corresponding instructions can be directly routed to the respective sensors for switching accordingly. In case the instructions require the activation of additional sensors, the communication module can route the instructions to the corresponding sensors for activating the sensors accordingly. In cases where the communication module has performed data pre-processing in LPM it can change or abandon the data pre-processing in accordance with the received instructions. Detailed examples of changes of precision parameters to generate HP status data are discussed in FIGS. 3A to 3C. After having switched to HPM the monitoring system 200 provides 2500 HP status data SD2 to the computer system 100 which is received 1500 by the interface module 110.

The router 150 can recognize that the monitoring system 200 is now operated in HPM. For example, the received status data may include a mode flag indicating whether the status data is HP status data or LP status data and the router can automatically route (provide) 1600 the LP data to the LP Machine Learning module 120 and the HP status data to the data analyzer 140. Alternatively, command generator 130 may inform the router 150 after having sent the HPM switching instructions to the monitoring system so that the router becomes aware that future status data will be HPM status data SD2 and route (provide) 1600 the HPM status data to the data analyzer 140, accordingly. The data analyzer 140 can be an integrated module of the computer system 100 or it may be a component running on a remote computer (e.g., a server computer, a mobile computing device, etc.) which is communicatively coupled with computer system 100.

In one embodiment, the data analyzer 140 includes a further HP Machine Learning Model 141 which is trained on training data complying with the second precision level. That is, the HP Machine Learning Model can be applied to the HP status data SD2 to analyze the HP status data for one or more indicators of an abnormal technical status. In other words, once the computer system operates in HPM, the predictive algorithm of the HP Machine Learning Model can analyze the HP status data with higher accuracy and predict potential failure of the technical system 300 with higher reliability based on the HP status data than the LP Machine Learning module 120 could do on the basis of LP status data. Because the HPM mode is only activated once the LP Machine Learning Models detects a suspicious situation, low battery and low bandwidth consumption can still be achieved during most of the time while the systems are operated in LPM. However, after the switch to HPM, the reliability of the data analysis and potential failure prediction is substantially improved. Of course, after the detection of an abnormal situation the systems are set back to LPM once the root cause for the abnormal situation is removed (e.g., spare part replacement). By using an HP Machine Learning Model, the data analyzer can detect abnormal situations automatically and autonomously and raise respective alarms for an operator of the technical system 300 if a preventive maintenance or repair action is required.

In one embodiment, the data analyzer 140 has a data streamer 142 to stream the HP status data SD2 to a human-machine interface (HMI) 150. The HMI 150 can include any known user interface technology to allow a user to interact with the data analyzer through, for example graphic user interfaces, speech based user interfaces, or gesture based user interfaces. In this embodiment, the data analyzer 140 has a data visualization role to present the HP status data reflecting the technical status of the technical system 300 to the user 10. The user 10 may be the operator of the technical system or an expert in the analysis of such technical status data. The streamed data is presented to the user 10 with the intention to take corrective action in order to avoid potential failure of the technical system 300.

In addition, in any embodiment the data analyzer 140 may further include a data storage component 143 to store the received HP status data SD2. Storing the HP status data allows offline analysis of the HP status data. Further, the stored data can be used to further train the HP Machine Learning Model 141 and improve the reliability of the prediction capability of the HP Machine Learning Model.

FIGS. 3A, 3B, 3C illustrate examples for changing precision parameters from low-precision mode to high-precision mode. A precision parameter, as used herein, is a parameter which, when being changed, has an impact on the quality of status data with regards to how the data affects the reliability of the predictive algorithms being used by the Machine Learning Models. Predictive Machine Learning Models are typically based on predictive classification algorithms or predictive regression algorithms. Such algorithms can be of a probabilistic or deterministic nature. Some well-known examples of predictive algorithms are Naïve Bayes, Adaptive Bayes Network, Hidden Markov Models and Support Vector Machine. Details on data mining or machine learning classification algorithms are described in "Data Mining—The Textbook" by Charu C. Arggarwal (2015) in Chapter 10: Data Classification, and in Chapter 11: Data Classification—Advanced Concepts. Details on data mining regression algorithms are described in "Applied Regression Analysis, A Research Tool, Second Edition" by John O. Rawlings, Sastry G. Patula, David A. Dickey (Springer, 1998).

FIG. 3A illustrates an example where the precision parameter is the number of sensors contributing to the status data SD1, SD2 being generated by the monitoring system. In the example, in the low-precision mode only one sensor S1 is providing sensor data for the LP status data SD1. The instructions received from the complementary computer system change the number of sensors by including instructions to activate sensor S2 to contribute to the HP status data S2. In the example, the LP status data is generated at the same rate as the HP status data. However, this does not necessarily to be the case. HP status data may be generated at a higher rate of even at a lower rate than the LP status data as long as the data quality is improved to allow more reliable predictions on the basis of the HP status data.

For example, for operating a wind turbine the observation of vibrations provide important information about the likelihood of upcoming failures of wind turbine components (e.g., gearbox). However, wind turbine vibration sensors are often subject to failures. For improving reliability of the sensor data, the vibration sensor data may be complemented by additional data collected by a temperature sensor to assure that the vibration sensor data correctly indicates an error. In the LPM vibrations are sensed by a vibration sensor with a predefined sampling rate and provided as LP status data to the LP Machine Learning Model. Once the LP Machine Learning Model detects an abnormality in the received LP status data it sends instructions to the monitoring system to activate a temperature sensor wherein the additional temperature sensor values complement the vibration sensor values to form the HP status data.

FIG. 3B illustrates an example where the precision parameter is the transmission rate (frequency) of the sensor data. In LPM the LP status data SD1 originates from sensor S1 and is sent at a first frequency. When the monitoring system receives instructions to switch to HPM the instructions cause the sensor S1 to increase the frequency of data collection and transmission. In the example, the HPM status data SD2 is generated by doubling the sampling rate of the sensor data provided by S1 in LPM.

For example, an issue with operating robots is a potential overheating of the robot cabinet. Therefore, it is advantageous to predict overheat of a robot cabinet based on monitored status data. Typically, temperature sensors and fan speed sensors in the cabinet are used for monitoring the technical status of the robot cabinet. Machine learning techniques can be used to build a prediction model (predictive Machine Learning Model) based on the monitored sensor parameter values to capture overheating several days in advance. The quality of the prediction model and therefore the reliability of the prediction increases when temperature and fan speed data is collected more frequently. At the same time, it is advantageous to limit the amount of data sent around the network.

In LPM a relaxed monitoring is acceptable. For example, only few times per day data about temperature and fan speed is collected which may be even preprocessed to have just one LP status data point for the day. The LP status data is given to a prediction model which correctly predicts overheat in 70 percent of the cases with high recall, low precision (which is the best quality to be achieved with the limited LP status data). Once this LP classifier predicts upcoming overheat detailed monitoring in HPM is activated. In the detailed monitoring phase sampling and preprocessing are different. The monitoring system collects data more frequently (e.g., every 10 minutes) and does not apply any preprocessing. For this type of HP status data a HP prediction model with high recall and high precision may be applied which has been trained before on the basis of such HP status data.

A further wind turbine example illustrates the combined use of the precision parameters frequency and number of sensors. An acoustic sensor may be used for Acoustic Emission Measurements. Acoustic emission (AE) is an energy emitted in the form of transient elastic wave or sound wave within material. The AE signal is obtained using AE equipment after the sound wave has been detected and processed electrically. Generally, the AE signal has a wide frequency range of 25 kHz to 3 MHz. However, it is normally analyzed and processed in the frequency range between 100 kHz to 1 MHz due to high sensitivity. For this example, sampling rates up to 2 MHZ can be good to indicate failures at an early stage, but obviously expensive to send or record. In LPM Acoustic data is not sampled with the full 2 MHz rate but with a lower rate, e.g. between 200 kHz and 1 MHz for e.g. 100 ms hourly. If the LP Machine Learning Model indicates a possible failure the recording or sending of Acoustic Emission Measurements with sampling rate up to 2 MHZ can be activated and detailed monitoring in HPM starts. In detailed monitoring, the acoustic sensor data can be recorded, for example, every few minutes for 100 ms length or even longer periods (e.g., 1 second.) The HP status data in this scenario is derived from a higher sampling rate where sensor data is collected more frequently than in the LPM.

FIG. 3C illustrates an example where the precision parameter is the grade of data pre-processing applied to sensor raw data to generate the status data. In LPM the LP status data SD1 is based on sensor raw data collected by sensor S1. For example, two subsequent sets of raw data are pre-processed resulting in one LP status data package SD1. Pre-processing as used herein includes any data processing operation applied to the sensor raw data (e.g., averaging, mean calculation, max or min determination, etc.) which can be used to reduce the amount of data to be sent through the network while still providing meaningful information about the technical status of the technical system. When switching to HPM, pre-processing is reduced or completely abandoned to improve the accuracy of the HP status data. In the example, the raw data sensed by S1 is used to generate the HP status data SD2.

An example, where data pre-processing is reduced when the monitoring system switches to HPM, includes at least one vibration sensor to measure the vibration of a pump. Thereby, a goal is the early identification of pump defects based on vibration data and a respective root cause analysis of the failures (e.g., failure of a blade). Typically, many pump failures result from slow processes of deterioration which are reflected by specific elements of the vibration spectrum of the pump. Vibration can be captured with a respective vibration sensor for industrial assets (e.g., a WiMon100 wireless vibration sensor provided by ABB AS Process Automation Division, Oslo, Norway). While aggregated vibration trend data taken from the pump indicate a deterioration of the pump, the root cause analysis requires a more detailed investigation of the vibration frequency spectrum over time. The frequency spectrum can be computed by a Fast Fourier Transformation (FFT) applied to the sampled vibration sensor data. For example, aggregated vibration trend data may be the integral over the entire frequency spectrum or a portion of the spectrum. Other appropriate aggregated trend data may be used instead. The aggregated trend data can be any single characteristic value derived from the vibration frequency spectrum which is an indicator for the characteristic spectrum of the pump when no abnormalities occur, and which changes in case of abnormal operation of the pump. In LPM, relaxed monitoring is applied as long as no indicators for deterioration (abnormalities) are present in the vibration frequency spectrum. The vibration sensor may capture a fast 100 ms time series a few times per day. For this sensor data FFT is applied and the overall trend value is computed for the respective sampling periods. Once an abnormality is identified detailed monitoring is activated to switch to HPM. In HPM, detailed monitoring occurs in that the vibration sensor collects fast time series at a higher sampling rate (e.g., every hour) and provisions the whole FFT spectrum for all data collections and not only a trend indicator to enable root cause analysis in the frequency spectrum data. In other words, the data pre-processing of sampled data is reduced in that the computation of the trend values is omitted and the FFT is applied directly to the sensor raw data sampled at a higher rate than in LPM. This allows to perform root cause analysis by analyzing the elements of the obtained frequency spectrum with regards to potential root causes for abnormal pump vibration behavior.

Information about the use of Machine Learning Models based on respective machine learning algorithms in the context of predictive maintenance can be found in the following references: —Widodo, Achmad, and Bo-Suk Yang. "Support vector machine in machine condition monitoring and fault diagnosis." Mechanical systems and signal processing 21.6 (2007): 2560-2574. —Miao, Qiang, and Viliam Makis. "Condition monitoring and classification of rotating machinery using wavelets and hidden Markov models." Mechanical systems and signal processing 21.2 (2007): 840-855. —Poyhonen, Sanna, Pedro Jover, and Heikki Hyotyniemi. "Signal processing of vibrations for condition monitoring of an induction motor." Control, Communications and Signal Processing, 2004. First International Symposium on. IEEE, 2004. —Shin, Hyun Joon, Dong-Hwan Eom, and Sung-Shick Kim. "One-class support vector machines—an application in machine fault detection and classification." Computers & Industrial Engineering 48.2 (2005): 395-408. —Kankar, P. K., Satish C. Sharma, and S. P. Harsha. "Fault diagnosis of ball bearings using machine learning methods." Expert Systems with Applications 38.3 (2011): 1876-1886.

Figure 4:
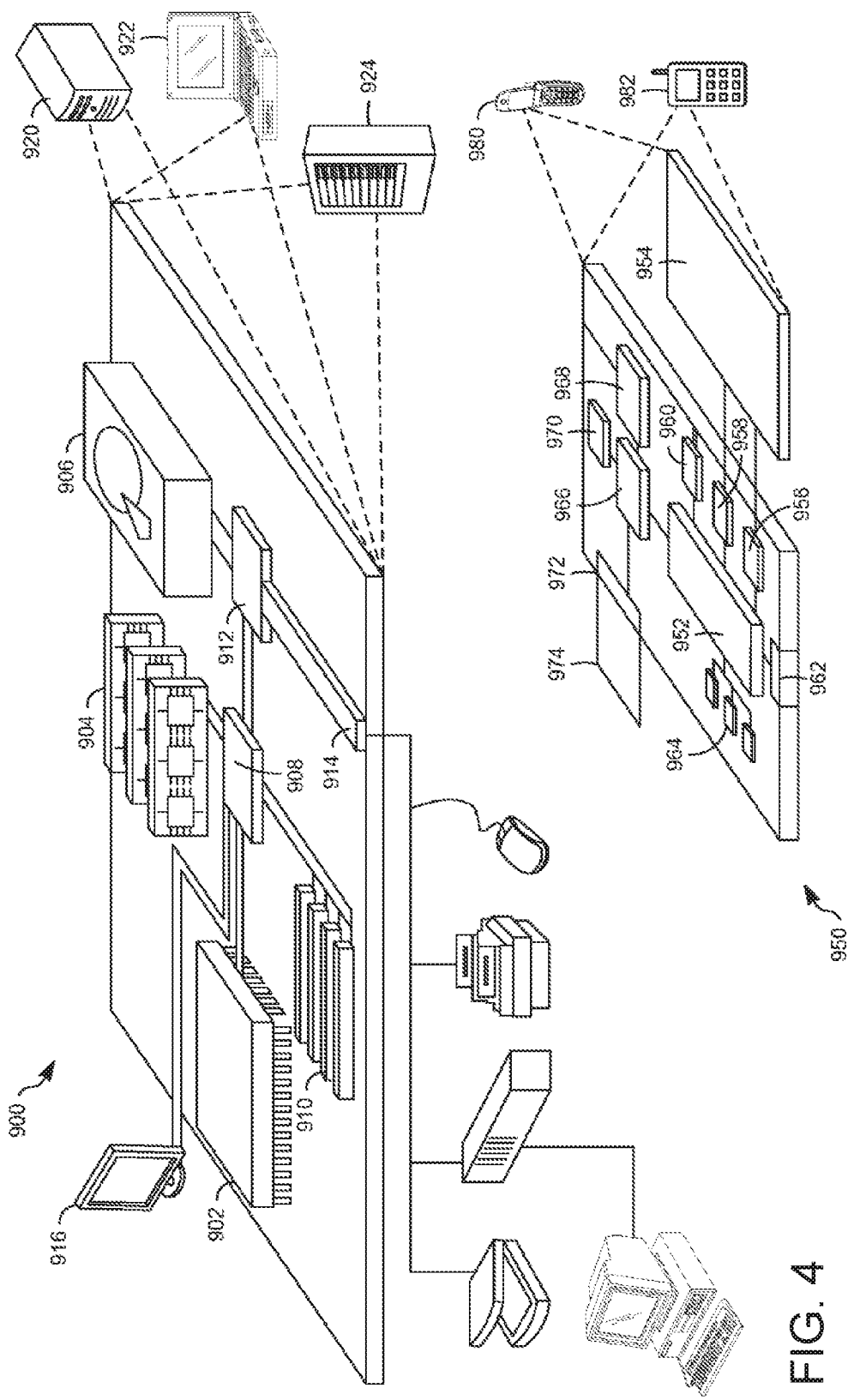
FIG. 4 is a diagram that shows an example of a generic computer device and a generic mobile computer device, which may be used with the techniques described here.

FIG. 4 is a diagram that shows an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to a computer system 100 as illustrated in FIG. 1. Computing device 950 is intended to represent various forms of mobile devices, such as personal digital assistants, cellular telephones, smart phones, and other similar computing devices. For example, computing device 950 may be used by an operator for communication with the computer system 100. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processing units and/or multiple buses may be used, as appropriate, along with multiple memories and types of memory. Also, multiple computing devices 900 may be connected, with each device providing portions of the necessary operations (e.g., as a server bank, a group of blade servers, or a processing device).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processing units. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, EDGE, UMTS, LTE, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a backend component (e.g., as a data server), or that includes a middleware component (e.g., an application server), or that includes a front end component (e.g., a client computer having a graphical user interface or a Web browser through which a user can interact with an implementation of the systems and techniques described here), or any combination of such backend, middleware, or frontend components. The components of the system can be interconnected by any form or medium of digital data communication (e.g., a communication network). Examples of communication networks include a local area network ("LAN"), a wireless local area network ("WLAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims. While embodiments have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

We claim:

1. A computer system for monitoring a technical status of a technical system, the computer system comprising:
an interface module configured to:
receive, by the computer system while operated in a low-precision mode, status data generated by one or more sensors recorded by a monitoring system while operated in the low-precision mode, the status data reflecting technical parameters of the technical system, the low-precision mode being defined by the received status data complying with a first precision level associated with low-precision parameters including at least one of: a number of sensors associated with the low-precision mode for providing status data in the low-precision mode, a sampling frequency associated with the low-precision mode for providing status data in the low-precision mode, a transmission frequency associated with the low-precision mode for providing status data in the low-precision mode, and one of a data pre-processing or data aggregation level associated with status data in the low-precision mode;
send one or more instructions to the one or more sensors of the monitoring system, the one or more instructions being configured to cause the one or more sensors to generate further status data, the further status data complying with a second precision level, the second precision level being associated with changes applied to a selection of the low-precision parameters in response to detecting an abnormality indicator, the second precision level being associated with higher data accuracy than the first precision level; and
receive the further status data from the monitoring system complying with the second precision level and to provide the further status data to a data analyzer of the computer system;
a machine learning module configured to apply a first machine learning model to the received status data, the first model having been trained on training data complying with the first precision level and being used to analyze the received status data for one or more indicators of an abnormal technical status to detect the abnormality indicator; and
a command generator module configured to generate the one or more instructions for the one or more sensors when the abnormality indicator being detected,
wherein the data analyzer comprises a second machine learning model having been trained on training data complying with the second precision level, the first machine learning model and the second machine learning model comprising predictive machine learning models based on a predictive classification algorithm or a predictive regression algorithm.

2. The system of claim 1, wherein the data analyzer comprises a data streamer configured to stream the second status data to a human-machine interface.

3. The system of claim 2, wherein the data analyzer comprises a data storage component to store the received second status data.

4. A monitoring system for monitoring the technical status of a technical system, the monitoring system comprising:
one or more sensors configured to generate, in a low precision mode on the monitoring system, sensor data reflecting technical parameters of the technical system, the low precision mode being defined by status data generated from the one or more sensors complying with a first precision level associated with low precision parameters including at least one of: a number of sensors associated with the low precision mode for providing status data in the low precision mode, a sampling frequency associated with the low precision mode for providing status data in the low precision mode, a transmission frequency associated with the low precision mode for providing status data in the low precision mode, and one of a data pre-processing or data aggregation level associated with status data in the low precision mode, the one or more sensors configured to change, in response to received instructions, at least one low precision parameter to generate further status data complying with a second precision level; and
a communication module configured to:
provide the status data generated in the low precision mode to a first machine learning model of a computer system trained to identify one or more indicators of an abnormal technical status of the technical system;
receive, from the computer system, instructions for the one or more sensors to generate sensor data for the further status data complying with the second precision level if the provided status data indicates an abnormal technical status, the second precision level being associated with changes of a selection of the low precision parameters in response to a detection of an abnormal status of the technical system, the second precision level being associated with higher data accuracy than the first precision level; and
provide the further status data to a second machine learning model of the computer system trained on training data complying with the second precision level.

5. The monitoring system of claim 4, wherein the change of the at least one low precision parameter includes any one or a combination of the following options:
the further status data includes additional status data from additional sensors, the additional status data not being included in the low precision mode;
the further status data is sent at a higher frequency to the computer system than the status data received in the low precision mode; and
the further status data is associated with a lower data pre-processing or data aggregation level than the status data sent in the low precision mode.

6. A computer-implemented method for monitoring the technical status of a technical system, the method comprising:
receiving, by a computer system while operated in a low-precision mode, status data generated by or more sensors recorded by a monitoring system while operated in the low-precision mode, the status data reflecting technical parameters of the technical system, the low-precision mode being defined by the received status data complying with a first precision level associated with low-precision parameters including at least one of: a number of sensors associated with the low-precision mode for providing status data in the low-precision mode, a sampling frequency associated with the low-precision mode for providing status data in the low-precision mode, a transmission frequency associated with the low-precision mode for providing status data in the low-precision mode, and one of a data pre-processing or data aggregation level associated with status data in the low-precision mode;

applying a first machine learning model to the received status data, the first machine learning model having been trained on training data complying with the first precision level to analyze the received status data for one or more indicators of an abnormal technical status;

if an abnormality indicator is detected, sending instructions to one or more sensors of the monitoring system to generate sensor data for further status data complying with a second precision level, the second precision level being associated with higher data accuracy than the first precision level, the second precision level being associated with changes applied to a selection of the low-precision parameters in response to the detection of the abnormality indicator;

in response to sending instructions, receiving the further status data complying with the second precision level from the monitoring system;

providing the further status data to a data analyzer having a second machine learning model trained on training data complying with the second precision level, wherein the first machine learning model and the second machine learning model comprise predictive machine learning models based on a predictive classification algorithm or a prediction regression algorithm.

7. A non-transitory computer readable medium comprising program code, which when executed by one or more processors of a computing device, causes the computing device to perform the method of claim 6.

8. A computer-implemented method, executed by a monitoring system, for monitoring the technical status of a technical system, the method comprising:

generating, in a low precision mode, sensor data by one or more sensors for status data reflecting technical parameters of the technical system, the low precision mode being defined by the status data complying with a first precision level associated with low precision parameters including at least one of: a number of sensors associated with the low precision mode for providing status data in the low precision mode, a sampling frequency associated with the low precision mode for providing status data in the low precision mode, a transmission frequency associated with the low precision mode for providing status data in the low precision mode, and one of a data pre-processing or data aggregation level associated with status data in the low-precision mode;

providing the status data to a first machine learning model of a computer system trained to identify one or more indicators of an abnormal technical status of the technical system;

receiving from the computer system one or more instructions for one or more sensors to generate sensor data for further status data complying with a second precision level associated with changes of a selection of the low precision parameters in response to the detection of an abnormal status of the technical system, the second precision level being associated with higher data accuracy than the first precision level;

in response to the received instructions, changing at least one low precision parameter to generate the further status data complying with the second precision level; and providing the further status data to a second machine learning model of the computer system trained on training data complying with the second precision level.

9. The method of claim 8, wherein changing the at least one low precision parameter includes any one or a combination of the following steps:

adding one or more additional sensors to the one or more sensors to provide the further status data including additional status data from the additional sensors, providing the further status data at a higher frequency than the status data provided in the low precision mode, and while generating the further status data, reducing the data pre-processing level or data aggregation level of the further status data in relation to the status data in the low precision mode.

10. A non-transitory computer readable medium comprising program code, which when executed by one or more processors of a computing device, causes the computing device to perform the method of claim 8.

11. The computer system of claim 1, wherein the one or more instructions comprise a change to a selection of the low-precision parameters, the change including any one or a combination of the following options:

a change of a number of sensors associated with the low-precision mode through activation of additional sensors, a change of any of the sampling frequency or the transmission frequency associated with the low-precision mode for providing the status data, and a change of any of the data pre-processing or data aggregation level associated with status data in the low-precision mode through a reduction of a degree of data pre-processing and/or data aggregation.

12. The computer system of claim 11, wherein the instructions relate to an activation of an additional sensor and a reduction of a status data providing frequency, the status data providing frequency comprising the sampling frequency and/or the transmission frequency.

13. The method of claim 6, wherein the one or more instructions comprise a change to a selection of the low-precision parameters, the change including any one or a combination of the following options:

a change of a number of sensors associated with the low-precision mode through activation of additional sensors, a change of any of a sampling frequency or a transmission frequency associated with the low-precision mode for providing the status data, and a change of any of the data pre-processing or data aggregation level associated with status data in the low-precision mode through a reduction of a degree of data pre-processing and/or data aggregation.

14. The method of claim 6, wherein the instructions relate to an activation of an additional sensor and a reduction of a status data providing frequency, the status data providing frequency comprising the sampling frequency and/or the transmission frequency.

15. The method of claim 8, wherein the instructions relate to an activation of an additional sensor and a reduction of a status data providing frequency, the status data providing frequency comprising the sampling frequency and/or the transmission frequency.

* * * * *